United States Patent Office 2,805,128
Patented Sept. 3, 1957

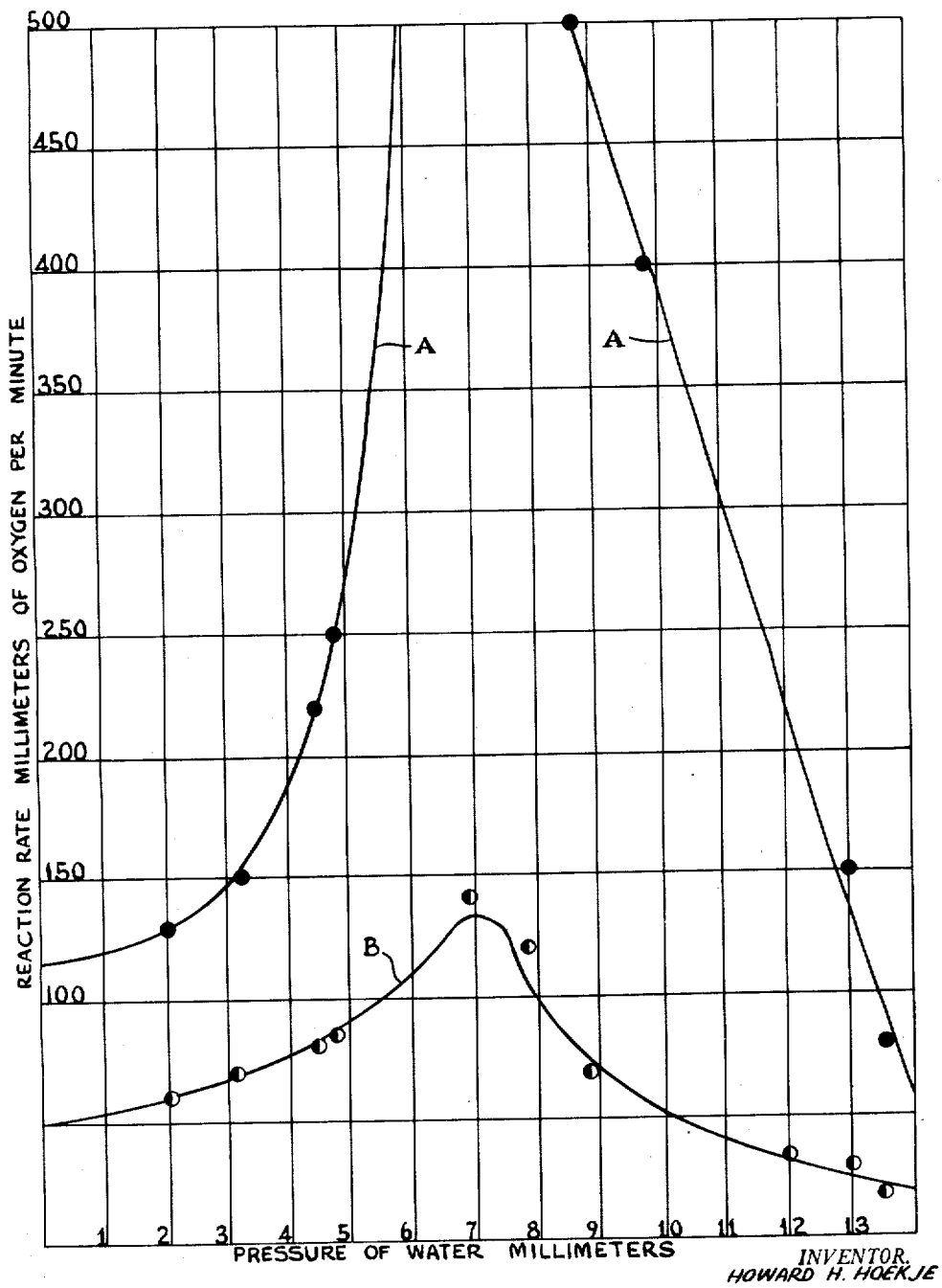

2,805,128

METHOD OF MAKING BARIUM PEROXIDE

Howard H. Hoekje, Corpus Christi, Tex., assignor to Columbia-Southern Chemical Corporation, Allegheny County, Pa., a corporation of Delaware Application July 5, 1952, Serial No. 297,234

4 Claims. (Cl. 23—187)

This invention relates to a novel method of making barium peroxide. It has been known that barium oxide may be reacted with elemental oxygen which may be in the form of air, pure oxygen or other gaseous mixtures containing oxygen, with the consequent production of barium peroxide. Prior to the present invention it has been considered that water adversely affects the reaction and thus special precautions have been thought necessary in order to avoid the presence of water.

According to the present invention, it has been found that the rate of this reaction may be appreciably increased by conducting the reaction with oxygen (including air and like oxygen containing gas) containing an amount of water sufficient to establish a partial pressure in the peroxidizing gas of 2 to 13 millimeters of mercury at the temperature of peroxidation. When the pressure of peroxidizing gas is one atmosphere then the water content permissible is 0.25 to 1.7 percent by volume. Even within this range only a very narrow range of water content will insure optimum conversion. For optimum conversion of barium oxide to barium peroxide the water content of the air should be about 4 to 7 millimeters of mercury. The amount of water present should be carefully controlled to maintain it within these limits since the advantageous results are not obtained at other water concentrations. To achieve these concentrations it is usually necessary to dry atmospheric air which generally contains excessive water. This drying may be effected by treating excessively humid air with chemical dehydrating agents or by condensing out moisture as for example by compressing the air.

The accompanying drawing illustrates the material increase in rate which is achieved by control of the water in the oxygen gas.

In the tests upon which these curves are based barium oxide powder which was prepared by calcination of barium-carbonate-carbon mixture having the composition 93.5 percent $BaCO_3$, 6 percent C 2.75 grams of this mixture was placed in an alumina boat and placed in a reaction chamber. The carbonate-carbon mixture was heated in vacuo to 950° C. until the pressure therein became constant at 3 to 15 millimeters of mercury. Thereupon the reaction chamber was allowed to cool to 550° C. and oxygen and water vapor were introduced to a total pressure of 500 millimeters of mercury. The rate of fall of the pressure at 550° C. was measured thus providing data for the designated points on the curves. As shown in this drawing, two curves designated "A," and "B," are illustrated. Curve "A" illustrates the instantaneous rate of reaction in terms of millimeters of oxygen reacted per minute with a given quantity of barium oxide and oxygen at 550° C. with various pressures of water in the oxygen gas. Thus, when the barium oxide is subjected to an average oxygen pressure of approximately 300 millimeters, and where the water content of this oxygen was sufficient to establish a pressure of approximately 4.7 millimeters, the rate of consumption of the oxygen was sufficient to reduce the pressure at the rate of 250 millimeters per minute at a temperature of 550° C. Similarly, when the water pressure is raised to approximately 8.7 millimeters, the oxygen reacts so rapidly as to reduce the oxygen pressure at the rate of 500 millimeters per minute. In contrast, it will be noted that various other points on the curve show that the rate is much lower when the water pressure is below 2 or above 13 millimeters.

A similar effect is observed when the oxygen pressure is at 150 millimeters of mercury, that is, at substantially the oxygen pressure of atmospheric air. This is illustrated in curve B. There it is shown that the rate of reaction of the barium oxide with oxygen increases as the water content of the oxygen or air increases from 3 millimeters to a maximum of approximately 7 millimeters. Thereafter, as the water content increases, the rate of reaction decreases.

The highest yields of $BaO_2$ are obtained at approximately a water partial pressure 4 to 7 millimeters of mercury. The oxygen pressure should exceed about 100 millimeters of mercury. Superatmospheric pressures above about 5 pounds per square inch gauge often are advantageous when air is used in the peroxidation in order to increase the oxygen partial pressure and enhance the rate of reaction.

The desired water content may be established in any convenient manner. Where the water content of the oxygen containing gas is too low, water may be introduced by injecting steam therein. Where the gas is too wet, moisture may be removed by cooling and/or compressing the air to be used in the peroxidation.

The peroxidation generally is conducted by heating barium oxide in the oxygen containing atmosphere at a temperature of about 350 to 700° C. While finely divided barium oxide may be peroxidized, less problems due to dust and fusion are encountered if the barium oxide is in the form of granules having a size of about 10 to 80 mesh. These granules may be most easily formed by preparing granules of barium carbonate and calcining these granules to barium oxide.

The barium carbonate used to produce the barium oxide particles should be of a relatively fine particle size, usually being well below 100 mesh. This barium carbonate is then made up into pellets or particles by mixing the barium carbonate, carbon black or like carbonaceous reducing agent and a suitable carbonaceous binder. Such binder must be capable of decomposing to evolve carbon or a gas, such as carbon dioxide or carbon monoxide, at the temperature of operation. Typical binders are starch paste, such as pastes formed from wheat starch and other grain starches, including corn starch, rice starch, and various other gluten-containing materials, glue, sugars, syrups, molasses, and the like, and various other carbonaceous binders of analogous character, particularly those compatible with water. The amount of binder which is used is not large, and thus, does not appreciably affect the required carbon content of the barium carbonate-carbon mixture. Usually, water is used in conjunction with the binder.

In the production of these granules or pellets, carbon, barium carbonate, and the binder are mixed with water in a suitable manner, for example, in a pug mill, to produce a plastic formable mass, and the product is extruded or otherwise formed into rods or like shape, usually having a diameter of ⅛ to ¼ inches. These rods are dried at a low temperature, for example, 100 to 150° C., in order to remove a major portion of the water therefrom. After the drying operation, the extruded rods are found to lose less than 0.3 percent by weight of moisture when heated at 150° C. over a period of 2 hours.

This amount is not objectionable although larger amounts tend to cause fusion and scaling in the subsequent calcination by the fluidizing process hereinafter described. Thereafter, the granules are lightly crushed and screened in order to obtain particles of the size specified above.

In the practice of the calcination, a tubular reactor adapted to hold a fluidized bed is provided. An upwardly flowing stream of inert or non-reactive gas, such as nitrogen, is introduced into the lower portion of the tube, and a body of previously calcined barium oxide granules is introduced into the reactor to establish a dense fluidized bed thereof. Such a bed has a well defined upper level and is characterized by its high turbulence and its resemblance to a boiling liquid.

The fluidized bed having been established, it is heated to calcination temperature and barium carbonate granules introduced. Thereafter, the barium carbonate granules are fed and barium oxide granules withdrawn continuously or intermittently. The composition of the bed remains high in barium oxide, at least 50 percent and usually running over 90 percent by weight of BaO, and, thus, fusion is minimized by the high BaO content of the bed.

The temperature of operation of the calcination reactor generally is established between 800 and 1000° C. While higher temperatures are operative, the problem of obtaining walls of suitable metal, which will stand up during operation and will conduct heat through to the reaction, becomes more complex. Furthermore, fusion becomes more serious. Using refractory materials of constructions which are especially adapted to stand the required temperature, temperatures as high as 1200° C. or even higher, can be resorted to. However, the problem of supplying heat to the calcination through a refractory wall is difficult. Heat is supplied by heating the reactor through its walls and/or by preheating the fluidizing gas.

It is found desirable to use a relatively pure grade of carbon in the granules. Thus, where the carbon is relatively impure, the impurities tend to remain in the barium carbonate. The resulting barium oxide, of course, is used to produce hydrogen peroxide as above discussed and, in consequence, the barium carbonate ultimately formed tends to contain the impurities which have been incorporated or added in the carbon. As the barium carbonate is recycled through a plurality of cycles, such impurities build up to objectionable concentrations. Consequently, a relatively pure form of carbon is found to be advantageous. Lampblack and various gas blacks are suitable for this purpose. Moreover, petroleum coke, petroleum patch, or other hydrocarbons which crack or otherwise function to supply carbon to the reaction may be used, provided the amount of impurities is not excessive.

Further details respecting the calcination process appear in U. S. Patent No. 2,772,950, granted December 4, 1956, to Henry W. Rahn et al.

The resulting product is largely barium oxide but contains a small amount (usually less than 10 percent and preferably not over 1 to 5 percent by weight $BaCO_3$) depending upon the degree of calcination. The product is in the form of hard, well bonded, porous granules. This bonding probably is due to slight localized fusion of the particles.

For best results the water content of barium oxide to be peroxidized should be low, usually below 0.5 percent by weight and preferably below 0.2 percent by weight.

The following are typical examples of methods of preparing the barium oxide for peroxidation according to this invention.

*Example I*

The calcination reactor comprised a vertically mounted metal tube having a diameter of 4 inches at the top of the bed level and a diameter of 3 inches at the end of the tube where it was tapered to provide the inlet for the reactants. The distance between the lower end of the tube and the top of the bed was 56 inches.

In a typical operation, 100 parts by weight of finely divided barium carbonate having a particle size of minus 100 to plus 300 mesh, 7 parts by weight of carbon lampblack, and one part by weight of an aqueous paste of wheat starch, were mixed together using an amount of water sufficient to make a stiff plastic mass. The product was extruded through dies approximately $\frac{1}{16}$ inch in diameter. The extruded product was baked for about 12 hours at a temperature of about 140° C. The resulting product comprised a plurality of particles approximately $\frac{1}{16}$ inch in diameter and ranging from about $\frac{1}{16}$ to $\frac{1}{4}$ inch in length. These products were then cracked or mildly crushed, and the crushed product was screened to obtain a product ranging from minus 14 to plus 30 mesh in size.

In the calcination, nitrogen was preheated by passing through a fluidized bed of graphite granules having a particle size of about minus 14 to plus 80 mesh. The temperature of the nitrogen gas escaping from this bed was approximately 540° C. The temperature of the bed was approximately 850 to 900° C. Consequently, the oxygen and carbon dioxide in the nitrogen were almost quantitatively converted to carbon monoxide. (Note that the nitrogen entering the fluid carbon bed contained 0.4 to 0.8 percent by volume of oxygen and only a minute amount of carbon dioxide.)

The resulting heated nitrogen was fed into the bottom of the calcination reactor at a rate of 200–265 cubic feet per hour, computed at 760 millimeters' pressure and 70° F. About 20 pounds of previously calcined barium carbonate granules of the type described above and containing in excess of 95 percent BaO, was dumped into the reactor and a fluidized bed was then established in the reactor. The temperature of this bed was maintained throughout the run at about 945 to 965° C. During the run, the barium carbonate granules were fed into the bed at a rate of 13 to 14 pounds per hour. The operation was continued over a period of 18 hours and the product was withdrawn continuously. This product contained 94 to 99 percent by weight of barium oxide.

*Example II*

The apparatus used was that described in Example I except that methane was fed, without pre-heating, into the reactor in lieu of nitrogen. Granules were prepared from a mixture of 1 part by weight of wheat paste and 100 parts by weight of barium carbonate, no carbon being used. These granules were produced by extrusion, drying, crushing, and sizing, as described in Example I. The barium carbonate granules thus obtained were fed to the reactor at a rate of 6.2 pounds per hour. Methane was fed into the reactor in lieu of nitrogen at a rate of 285 cubic feet per hour, measured at a pressure of 760 millimeters and a temperature of 70° F. The temperature of the reaction bed was maintained at approximately 975° C. during the run, and the barium oxide content of the bed remained at 90 to 92 percent by weight of the bed. The calcination was carried out for a period of 5 hours, and the product withdrawn contained 90 to 92 percent of barium oxide.

The peroxidation may be effected by various methods such as in a rotary kiln, a rotary earth furnace of the like. An especially advantageous way of effecting the peroxidation is by a fluidizing process. In such a case a bed of barium oxide granules having the characteristics discussed in connection with the calcination process is established in an upwardly stream of air or other oxygen-containing gas. This bed is heated to the reaction temperature preferably 550 to 650° C. The peroxidation occurs rapidly, usually in a matter of 10 to 15 minutes.

5

The following example is illustrative:

*Example III*

In the following tests, a stainless steel tube having an inside diameter of 2 inches and being 14 inches long was used. In performance of each test, nitrogen was introduced into the bottom of the tube and allowed to flow upwardly at a rate of about 3000 liters per hour, referred to a pressure of 760 millimeters and a temperature of 0° C. This nitrogen was pre-heated to substantially the operating temperature of the peroxidation. Two hundred grams of barium oxide granules, prepared as described in Example I and having a particle size of minus 10 to plus 80 mesh (over 80 percent being minus 20 to plus 50 mesh) were introduced into the reactor through the top and, thus, a fluidized bed was established.

The fluidized bed was heated in the nitrogen stream through the walls of the stainless steel tube for a time sufficient to establish temperature equilibrium in the bed. Thereupon, after the charge had reached 601–626° C., flow of nitrogen was discontinued and air was introduced in lieu thereof at about 4000 liters per hour, measured with reference to standard conditions, without destroying the fluid characteristics of the bed. Each test was continued for 30 minutes and the resulting product was promptly removed from the reactor and examined to determine the amount of barium peroxide which was formed. The results of these tests are set forth in the combined tables:

| Run No. | Water in Air Millimeters of Mercury | Composition of Product (Percent by Weight) | | | Percent Converted on Basis of Percent of Theoretical |
|---|---|---|---|---|---|
| | | Percent $BaO_2$ | Percent $BaCO_3$ | Percent Free Carbon | |
| 12 | 0.6 | 15.1 | 3.5 | 0.2 | 14.5 |
| 13 | 0.5 | 13.4 | 3.3 | 0.2 | 12.2 |
| 14 | 2.1 | 47.3 | 6.2 | 0.1 | 47.1 |
| 15 | 1.8 | 52.6 | 7.6 | 0.1 | 52.9 |
| 22 | 3.1 | 65.9 | 6.9 | 0.1 | 67.0 |
| 09 | 4.8 | 84.2 | 8.2 | | 87.6 |
| 20 | 6.0 | 83.2 | 7.9 | 0.1 | 86.4 |
| 23 | 1.8 | 53.3 | 6.8 | 0.1 | 53.5 |
| 16 | 3.8 | 75.0 | 8.2 | 0.1 | 77.2 |
| 17 | 5.0 | 83.7 | 8.3 | 0.1 | 87.0 |
| 18 | 6.8 | 81.4 | 8.2 | 0.1 | 84.4 |
| 21 | 6.4 | 80.7 | 6.5 | 0.1 | 83.3 |

In runs 23, 16, 17, 18 and 21 the pre-heating of the barium carbonate in nitrogen was eliminated and the charge was introduced directly into the air stream.

As shown by the above data, best conversions were obtained when the water content of the air was 4 to 7 millimeters of mercury. For example, in run No. 17 using water pressure of 5 millimeters of mercury a yield of 87 percent of the amount of $BaO_2$, theoretically possibly obtainable, was obtained. Similar results were obtained at water contents of 6.0 and 4.8 millimeters. However the percent conversion begins to fall off as the water content falls below 4 millimeters (see run No. 16) or is increased toward 7 (see experiment 18).

Where water is allowed to run beyond the preferred limits of 4 to 7 millimeters of mercury partial pressure the percent conversion falls off to a very appreciable degree. Attempts to use water pressures above about 13 millimeters cause very serious fusion of the bed.

6

The barium oxide granules used in these tests had the following composition:

| | Percent |
|---|---|
| BaO | 95.8 |
| $BaCO_3$ | 3.3 |
| $BaO_2$ | 1.4 |
| Free carbon | 0.4 |
| BaS | 0.5 |

The time of heating should be in excess of about 5 minutes. Thirty to sixty minutes is generally sufficient, although longer heating is not objectionable. In order to increase the rate of peroxidation, it is frequently advantageous to conduct the operation at a superatmospheric pressure. Air pressures above 5 pounds per square inch are found to be preferable.

The reaction of barium oxide with air need not be conducted in a fluidized bed although this is an especially good method of so doing. Thus, the peroxidation may be conducted by heating the barium oxide at 400–600° C. in a rotary kiln or like device and in a stream of air or other oxygen-containing gas. Optimum results are achieved at temperatures somewhat lower than the optimum for fluidized reaction. The time of heating in such case usually is about 1 to 3 hours. Moreover the invention herein contemplated may be used in peroxidation of finely divided barium oxide although peroxidation of granules is preferred.

Although the present invention has been described with reference to the specific details of certain embodiments, it is not intended that such details shall be regarded as limitations upon the scope of the invention except insofar as included in the accompanying claims.

What is claimed is:

1. A method of preparing barium peroxide which comprises heating barium oxide in air while adjusting the water content of said air to maintain the partial pressure of water in the air in contact with the barium oxide at from 4 to 7 millimeters.

2. A method of preparing barium peroxide which comprises heating barium oxide at a temperature of 350 to 700° C. in an oxygen atmosphere while adjusting the water content of said atmosphere to maintain the partial pressure of water in the oxygen atmosphere in contact with the barium oxide at from 4 to 7 millimeters.

3. The process of claim 2 wherein the temperature is 550 to 650° C.

4. A method of preparing barium peroxide which comprises heating barium oxide at a peroxidizing temperature in contact with an atmosphere comprising oxygen during a time when the partial pressure of water in the ambient atmosphere is outside the range of 4 to 7 millimeters, while adjusting and maintaining the partial pressure of water of the atmosphere in contact with the barium oxide at from 4 to 7 millimeters.

References Cited in the file of this patent

UNITED STATES PATENTS

| 267,551 | Marchand | Nov. 14, 1882 |
| 359,423 | Brin | Mar. 15, 1887 |

FOREIGN PATENTS

| 19,470 | Great Britain | A. D. 1898 |

OTHER REFERENCES

"Lange's Handbook of Chemistry," page 1228, 1941 ed. Published by Handbook Publishers, Inc., Sandusky, Ohio.

UNITED STATES PATENT OFFICE

CERTIFICATE OF CORRECTION

Patent No. 2,805,128                      September 3, 1957

Howard H. Hoekje

It is hereby certified that error appears in the printed specification of the above numbered patent requiring correction and that the said Letters Patent should read as corrected below.

Column 4, line 72, for "upwardly stream" read -- upwardly flowing stream --.

Signed and sealed this 14th day of January 1958.

(SEAL)

Attest:

KARL H. AXLINE
Attesting Officer

ROBERT C. WATSON
Commissioner of Patents